CURRENT REGULATOR UTILIZING A FLOATING REFERENCE VOLTAGE SUPPLY
Filed Feb. 3, 1969
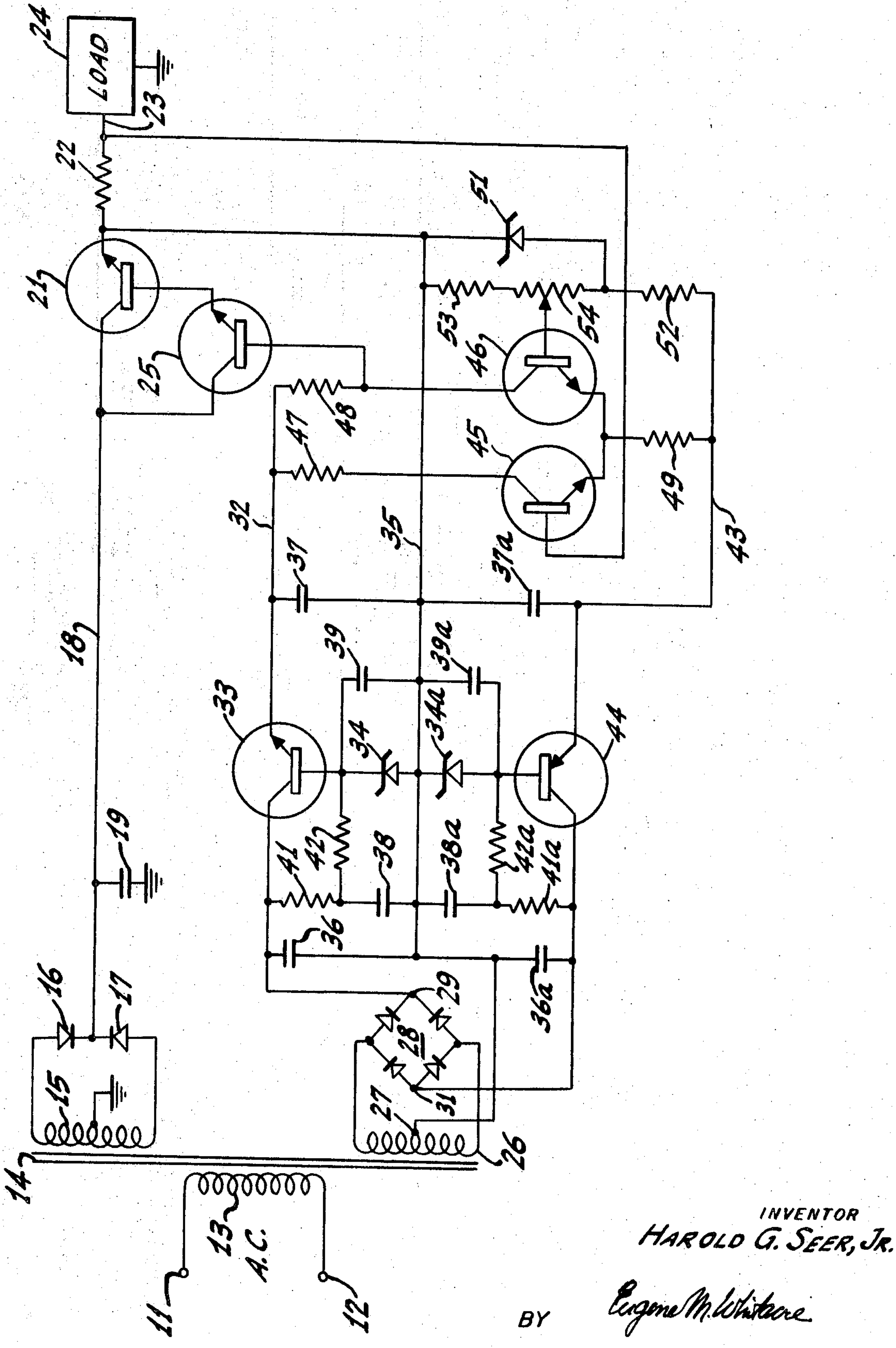
INVENTOR
HAROLD G. SEER, JR.
BY Eugene M. Whitacre
ATTORNEY United States Patent Office 3,566,246
Patented Feb. 23, 1971

3,566,246
CURRENT REGULATOR UTILIZING A FLOATING REFERENCE VOLTAGE SUPPLY

Harold George Seer, Jr., Woodbury, N.J., assignor to RCA Corporation, a corporation of Delaware Filed Feb. 3, 1969, Ser. No. 795,964
Int. Cl. G05f *1/56, 1/64*
U.S. Cl. 321—18 9 Claims

ABSTRACT OF THE DISCLOSURE

Current variation is sensed as a voltage change across a sensing resistor connected in series between a series pass transistor and a load terminal. The voltage change coupled to error sensing means which couples a control voltage to the pass transistor to control the load current. A common terminal of a floating voltage supply is coupled to one side of the sensing resistor such that a reference voltage coupled to the error sensing means is constant with respect to the common terminal voltage and does not vary with the load current.

BACKGROUND OF THE INVENTION

While there are numerous uses for a well regulated direct current supply, a particular need exists in television signal producing apparatus, one example of such a need being the current supply to the electromagnetic focus coils of a television camera. Such direct current must be supplied to these coils through a cable which includes a large number of conductors and may be a few thousand feet in length. Previously, in some cases, current has been supplied to television camera apparatus by means of a circuit comprising two cable conductors and each circuit included a current regulator which was preceded by a regulated voltage supply. At least one presently used commercial arrangement has a regulated high voltage direct current supply located in the auxiliary apparatus remote from the camera. This high voltage direct current is fed through the camera cable to the camera. The current in the focus coils is regulated at the camera by sampling the voltage across a resistor in the ground return of the focus coils. The required complex circuitry involves as many as thirteen transistors.

It is an object of this invention to provide an improved regulated direct current supply requiring fewer components for apparatus, such as the focus coils of television cameras, which is highly stable and requires only a single cable conductor.

In accordance with the invention, a source of direct current is coupled to a load by means including a series arrangement of a current regulating transistor and a current sensing resistor which controls the operation of a differential amplifier relative to a voltage reference, the amplifier output being employed to control the conductivity of the regulating transistor suitably to maintain the direct current substantially constant. The voltage reference apparatus and the differential amplifier are energized by a regulated floating power supply furnishing positive and negative voltages relative to an ungrounded neutral voltage. The regulated direct current is supplied to the load by means of a single conductor, the return path being through a ground circuit, for example.

For a more specific disclosure of the invention, reference may be had to the following detailed description of an illustrative embodiment thereof which is given in conjunction with the accompanying drawing, in which the single figure is a schematic circuit diagram of a direct current regulator embodying the invention.

DESCRIPTION OF THE INVENTION

Alternating current supplied to input terminals 11 and 12 is impressed upon the primary winding 13 of a transformer 14. A first secondary winding 15, having a grounded center tap is connected to a pair of diodes 16 and 17 to provide a full wave rectified positive voltage on conductor 18. The rectified voltage is filtered by a capacitor 19 and is applied to the collector electrode of a current regulating transistor 21, the emitter electrode of which is connected through a current sensing resistor 22 and a single conductor 23 to a load 24, such as the focus coil of a television camera. The conductivity of the current regulating transistor 21 is controlled by an emitter follower driver transistor 25, the collector electrode of which is connected to the conductor 18 and the emitter electrode of which is connected to the base electrode of the regulating transistor 21. Where the voltage on the conductor 18 is of positive polarity because of the connections of the rectifier diodes 16 and 17 as illustrated, the transistors 21 and 25 both are NPN types. The conductivity of the driver transistor 25, and hence the conductivity of the regulating transistor 21, is varied by the impression upon the base electrode of the driver transistor of an error signal voltage, produced in a manner presently to be described, which is representative of any current change through the sensing resistor 22. The resultant changes in the conductivity of the regulating and driver transistors 21 and 25, respectively, maintains the current supplied to the load 24 through the single conductor 23 substantially constant at a predetermined value.

The following is a description of a low current, voltage regulated power supply forming part of the invention and serving to energize the other yet-to-be-described components of the current regulator. A second secondary winding 26 of transformer 14, having a mid-point tap 27, is connected to a full wave rectifier means 28 having positive and negative polarity output terminals 29 and 31 respectively. The terminal 29 is connected to a positive polarity bus 32 through a first open loop series voltage regulating transistor 33, the collector electrode of which is connected to the terminal 29 and the emitter electrode of which is connected to the bus 32. The base electrode of the transistor 33 is connected through a voltage reference Zener diode 34 to an ungrounded neutral bus 35 which is connected to the mid-point tap 27 of the secondary transformer winding 26 so that the base electrode of this transistor effects suitable collector-to-emitter conductivity of the transistor to maintain a fairly constant voltage applied to the positive polarity bus 32 relative to the ungrounded neutral bus 35. The capacitors 36 and 37 provide filtering for the voltage of the positive polarity bus 32. The capacitors 38 and 39 and the resistors 41 and 42 provide additional filtering for the voltage reference diode 34. The output terminal 31 of the full wave rectifier 28 is connected to a negative polarity bus 43 through a second open loop series voltage regulating transistor 44, the collector electrodes of which is connected to the terminal 31 and the emitter electrode of which is connected to the bus 43. The other circuit components of the power supply furnishing a negative voltage to the bus 43 which are the same as, and perform similar functions to, the described corresponding components of the power supply furnishing a positive voltage to the bus 32 are designated by the same reference characters followed by the subscript *a*. Because of the different polarities of the busses 32 and 43 the regulating transistors 33 and 44, respectively, are NPN and PNP conductivity types and the reference diodes 34 and 34*a* are connected in opposite polarities between the ungrounded neutral bus 35 and the base electrodes of the respectively associated regulating transistors 33 and 44.

The combination of apparatus components comprising this invention also includes a differential amplifier of which the active elements are two transistors 45 and 46 of like conductivity. In the illustrative embodiment of the figure the transistors 45 and 46 are NPN types having their collector electrodes respectively connected to the positive polarity bus 32 through individual resistors 47 and 48 and their emitter electrodes connected to the negative polarity bus 43 through a common resistor 49. The terminal of the current sensing resistor 22 which is connected to the emitter electrode of the current regulating transistor 21 also is connected to a reference source comprising a Zener reference diode 51 connected from the ungrounded neutral bus 35 to the negative polarity bus 43 through a resistor 52 which supplies operating current to the diode. The voltage reference source for the current supply also includes a series arrangement of a resistor 53 and a potentiometer 54 connected across the Zener reference diode 51. The current regulator control circuit also includes the connection of the base electrode of the amplifier transistor 45 to the terminal of the current sensing resistor 22 which is connected to the single conductor 23 leading to the load 24. The base electrode of the amplifier transistor 46 is connected to the adjustable contact of the potentiometer 54, this connection maintaining a fixed voltage on the base electrode of the transistor 46 relative to the neutral bus 35. An error signal voltage, representing any change in the predetermined value of the current supplied to the load 24, which is developed at the collector electrode of the amplifier transistor 46, is applied by the illustrated connection to the base electrode of the driver transistor 25 for its control as described.

In the operation of the described regulated current supply if the input voltage at the alternating current terminals 11 and 12 tends to increase, the current supplied to the load 24 from the conductor 18 through the current regulating transistor 21 and the sensing resistor 22 also tends to increase. The resultant increased voltage drop across the resistor 22 causes the impression of an increased negative voltage upon the base electrode of the differential amplifier transistor 45 relative to the neutral bus 35, thereby decreasing its collector-to-emitter current conduction which, by means of the interconnection of the emitter electrodes of both amplifier transistors 45 and 46, produces an increase of the collector-to-emitter current conduction through the transistor 46 by virtue of the fixed voltage reference voltage applied to its base electrode from the potentiometer 54. The increased current conduction through the transistor 46 produces a decreased positive voltage at its collector electrode because of an increased voltage drop across the resistor 48. This decreased positive voltage constitutes the error signal voltage and its impression upon the base electrode of the emitter follower driver transistor 25 causes the impression by means including its emitter electrode of a decreased positive voltage upon the base electrode of the current regulating transistor 21, thereby decreasing its collector-to-emitter current conduction which results in the maintainance of a constant current supplied to the load 24 through the sensing resistor 22 and the single conductor 23.

If the current supplied to the load 24 should tend to decrease, the decreased voltage drop across the current sensing resistor 22, when applied to the differential amplifier, would cause a decrease of the collector-to-emitter current conductivity of the amplifier transistor 46 and an increase of the collector-to-emitter current conductivity of the driver and regulating transistors 25 and 21, respectively, the latter thereby maintaining the current supplied to the load at its desired value.

The desired value of the current supplied to the load 24 is determined by the adjustment of the potentiometer 54 of the voltage reference apparatus. In cases where extreme temperature stability of the described current regulating apparatus embodying the invention is required, the voltage reference Zener diode 51, the potentiometer 54, and the resistors 22, 52 and 53 should be components which have high inherent temperature stability; and the differential amplifier transistors 45 and 46 should be a dual unit.

It should be recognized that the current regulating apparatus embodying the present invention also is capable of regulating current of negative polarity supplied to the load 24. In such a case, the rectifier diodes 16 and 17 would be connected in opposite polarities to those shown in the figure. Also, the regulating transistor 21, the driver transistor 25, and the differential amplifier transistors 45 and 46 would be PNP types. The positive and negative output terminals 29 and 31 of the full wave rectifier 28 would be connected, respectively, to the busses 43 and 32, in which case the bus 32 would be of negative polarity and the bus 43 would be of positive polarity. Furthermore, the voltage regulating transistors 33 and 44 would be PNP and NPN types respectively. Finally, the Zener diodes 34, 34a and 51 would be connected in their respective circuits in a polarity opposite to that shown in the figure. The illustrated circuit, with these changes, will operate in the manner described to maintain a negative current flow through the load 24 substantially constant at a value determined by the adjustment of the potentiometer 54.

The disclosed apparatus of the invention constitutes a highly stable regulated current supply which is capable of maintaining substantially constant a predetermined value of current through a load under varying conditions such as relatively large changes of the alternating current input voltage and of the load resistance, for example. Also, it is of such a novel character that only one conductor is needed to supply the regulated current to the load, which is particularly advantageous when the current is provided to television camera apparatus through cables which have a great multiplicity of conductors used for other purposes and often are of great length. Thus, the invention enables more efficient use of such cables.

What is claimed is:

1. A current regulator for supplying a substantially constant current to a load, comprising:

- a source of direct current;
- current conducting coupling means including at least one current regulating transistor and a two terminal series connected current sensing resistor connecting said direct current source to said load;
- a unidirectional power supply having a common floating terminal thereof coupled to a first terminal of said sensing resistor;
- voltage reference means for said substantially constant current coupled to said unidirectional power supply and to said first terminal of said current sensing resistor;
- a differential amplifier having first and second inputs and an output;
- means coupling said first input of said differential amplifier to said voltage reference means whereby a reference voltage coupled to said first input is constant with respect to said common floating terminal and does not vary with load current variations;
- means coupling said second input of said differential amplifier to a second terminal of said current sensing resistor; and
- control means coupling the output of said differential amplifier to said current regulating transistor to control its conductivity.

2. A current regulator as defined in claim 1, wherein:

- said current conducting coupling means comprises the series connection of the collector and emitter electrodes of said current regulating transistor between said direct current source and said first terminal of said current sensing resistor, and a driver transistor having its collector and emitter electrodes connected in series between said direct current source and the base electrode of said current regulating transistor; and said control means includes a connection between the output of said differential amplifier and the base electrode of said driver transistor.

3. A current regulator as defined in claim 2, wherein:

said voltage reference means includes a Zener diode and a series connected resistor supplying operating current to said diode; and means including a potentiometer having its resistive element connected across said diode and its adjustable contact element connected to said first input of said differential amplifier.

4. A current regulator as defined in claim 3, wherein:

said differential amplifier includes a pair of first and second transistors having their respective collector electrodes connected to said unidirectional power supply through individual resistors and having their respective emitter electrodes connected to said unidirectional power supply through a common resistor;

means connecting the base electrode of said first amplifier transistor to the adjustable contact element of said potentiometer;

means connecting the base electrode of said second amplifier transistor to said second terminal of said current sensing resistor; and means connecting the collector electrode of said first amplifier transistor to the base electrode of said drive transistor.

5. A current regulator as defined in claim 4, wherein:

said unidirectional power supply includes full wave rectifier means having two output terminals respectively supplying substantially equal voltages of opposite polarities to two busses respectively of positive and negative polarities relative to a third ungrounded neutral bus;

the collector electrodes of said amplifier transistors being connected to one of said two busses of a given polarity and the emitter electrodes of said amplifier transistors being connected to the other of said two busses of an opposite polarity; and said voltage reference means being connected between one of said two busses and said third ungrounded neutral bus.

6. A current regulator for supplying a substantially constant current to a load, comprising:

a source of direct current;

current conducting coupling means including the series connection of a current regulating transistor and a current sensing resistor, said current regulating transistor having its collector electrode coupled to said direct current source, its emitter electrode coupled to a first terminal of said sensing resistor, a second terminal of said sensing resistor coupled to said load, and a driver transistor having its collector and emitter electrodes connected in series between said direct current source and the base electrode of said current regulating transistor;

a unidirectional power supply including full wave rectifier means having two output terminals respectively supplying substantially equal voltages of opposite polarities to two busses respectfully of positive and negative polarities relative to a third ungrounded neutral bus, an NPN voltage regulating transistor having its collector and emitter electrodes connected in series between one output terminal of said full wave rectifier means and said positive polarity bus, and a PNP voltage regulating transistor having its collector and emitter electrodes connected in series between the other output terminal of said full wave rectifier means and said negative polarity bus;

two voltage reference Zener diodes connected between the respective base electrodes of said NPN and PNP voltage regulating transistors and said ungrounded neutral bus;

voltage reference means for said substantially constant current coupled between one of said two busses of opposite polarity and said neutral bus and further coupled to said first terminal of said current sensing resistor and including a Zener diode and a series connected resistor supplying operating current to said diode, and means including a potentiometer having its resistive element coupled across said diode;

a differential amplifier including first and second amplifying transistors having their respective collector electrodes connected to respective busses of opposite polarity in said unidirectional power supply through individual resistors and having their respective emitter electrodes connected to said unidirectional power supply through a common resistor, means connecting the base electrode of said first amplifier transistor to the adjustable contact element of said potentiometer in said voltage reference means, means connecting the base electrode of said second amplifier transistor to said second terminal of said current sensing resistor; and control means coupling the collector electrode of said first amplifying transistor to the base electrode of said driver transistor.

7. A current regulator as defined in claim 6, wherein:

for a given polarity of said substantially constant current, said current regulating and driver transistors and said differential amplifier transistors are all of the same conductivity type; and said voltage reference means is connected to said unidirectional power supply between said ungrounded neutral bus and that one of said positive and negative busses to which the emitter electrodes of said differential amplifier transistors are connected.

8. A current regulator as defined in claim 7, wherein:

for a positive polarity of said substantially constant current, said current regulating and driver transistors and said differential amplifier transistors are all of an NPN type; and said voltage reference means is connected to said unidirectional power supply between said ungrounded neutral bus and said negative polarity bus.

9. A current regulator as defined in claim 7, wherein:

the components of said voltage reference means including said Zener diode, its series connected operating current supplying resistor, and said potentiometer have high inherent temperature stability; and said transistors of said differential amplifier comprise a dual unit.

References Cited

UNITED STATES PATENTS

| | | | |
|---|---|---|---|
| 2,829,334 | 4/1958 | Murnighan | 323—4X |
| 3,196,343 | 7/1965 | Griffin | 323—4UX |
| 3,250,922 | 5/1966 | Parham | 323—4UX |
| 3,340,404 | 9/1967 | Willems et al. | 323—22X(T) |
| 3,388,318 | 6/1968 | O'Brien | 323—22X(T) |
| 3,401,335 | 9/1968 | Perkinson | 323—4UX |

WILLIAM M. SHOOP, Jr., Primary Examiner

A. D. PELLINEN, Assistant Examiner

U.S. Cl. X.R.

323—4